United States Patent Office 3,358,505
Patented Dec. 19, 1967

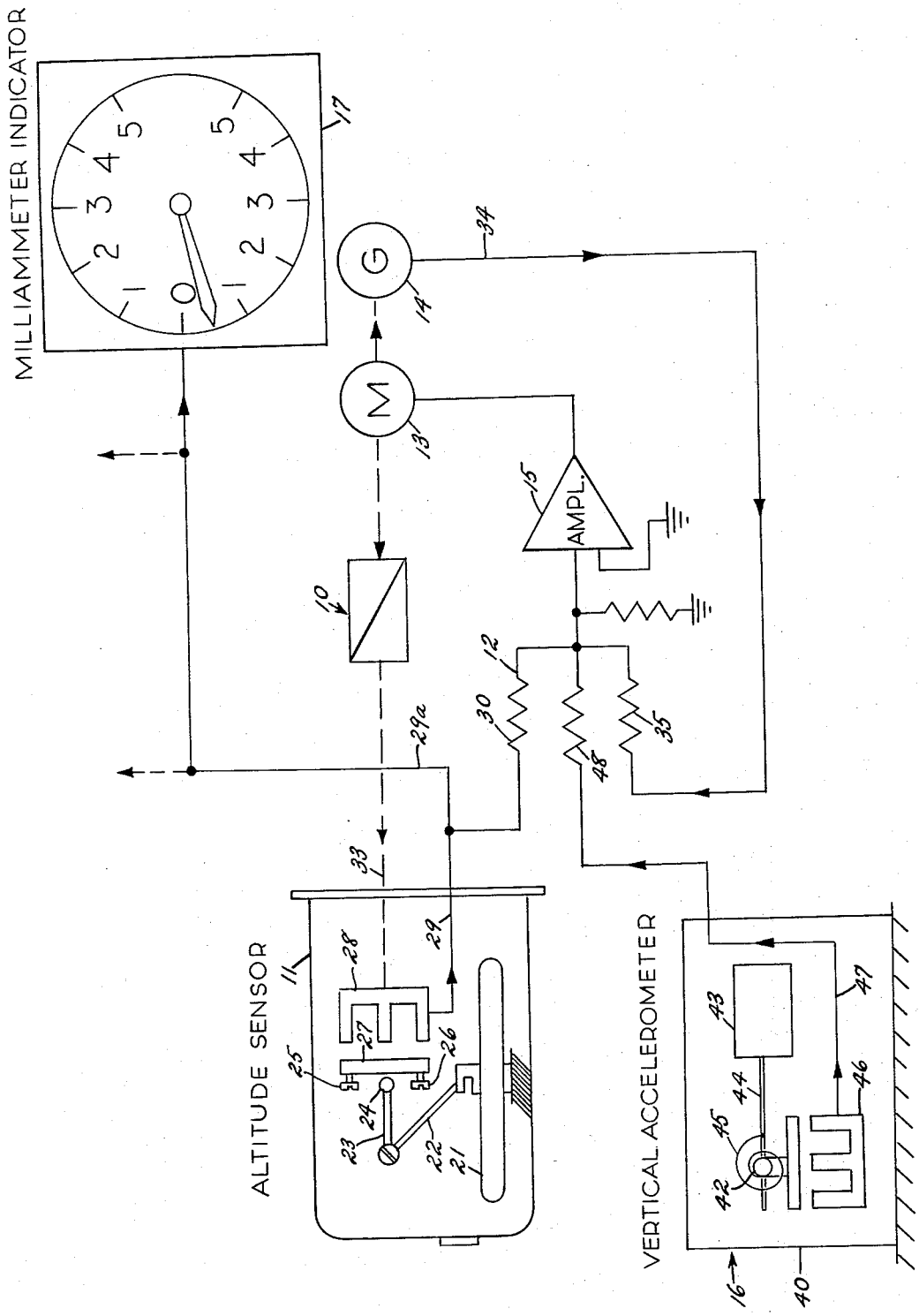

3,358,505
ALTITUDE RATE INDICATING SYSTEM
John H. Andresen, Jr., Hewitt, N.J., assignor to Intercontinental Dynamics Corporation, Englewood, N.J.
Filed May 18, 1965, Ser. No. 456,617
2 Claims. (Cl. 73—179)

ABSTRACT OF THE DISCLOSURE

An altitude rate indicating system using a null type altitude sensor having a rate of climb meter coupled directly to the sensor. A motor which is responsive to a generated rate signal which is corrected by a vertical accelerometer drives the sensor pick-off to a null.

---

This invention relates generally to the field of instrumentation, and more particularly to an improved altitude rate indicating system for use in aircraft, space vehicles and the like. Devices of this type are generally known in the art, and the invention lies in specific constructional details permitting an improved mode of operation and shortened time constant.

It is among the principal objects of the present invention to provide an improved altitude rate indicating system which may be relatively unaffected by sudden changes in rate of pressure altitude change, thereby permitting superior utilization of information provided by the pilot.

Another object of the invention lies in the provision of an improved rate indicating system in which a relatively short time constant is provided without erratic pointer movement.

Yet another object of the invention lies in the provision of an improved altitude indicating system in which the relative complexity thereof is directly comparable to existing prior art devices.

A further object of the invention lies in the provision of an improved altitude rate indicating system in which the cost of fabrication thereof may be directly comparable to existing prior art devices, while incorporating improved operation, thereby permitting consequent wide sale, distribution and use.

A feature of the invention lies in the fact that the disclosed embodiment employs components already known and existing in the art, thereby facilitating manufacture.

These objects and features, as well as other incidental ends and advantages, will more fully appear in the progress of the following disclosure, and be pointed out in the appended claims.

In the drawing, to which reference will be made in the specification, the single figure is a schematic view of an embodiment of the invention.

In accordance with the invention, the device, generally indicated by reference character 10, comprises broadly: an altitude sensor element 11, a summing network 12, a motor element 15, a vertical accelerometer element 16, and a milliammeter 17 having an altitude rate scale thereon.

The altitude sensor element 11 may be of a well-known type, including a casing 20 enclosing an evacuated capsule 21 forming aneroid means, the capsule 21 being connected to linkage 22 and 23 operating a torsion pivot 24 through a small arc regulated by stops 25 and 26. The torsion pivot supports an iron member 27 which with part 28 forms a conventional E–1 pickoff which provides a varying signal on conductor 29, a portion of which is directed through a resistor 30 which forms a part of the summing network 12, the signal also passing through a conductor 29a to operate the milliammeter 17.

Current passes through the summing network 12 to the amplifying element 15, and hence through a conductor 31 to the motor element 13, the direction of current being such as to drive the altitude sensor shaft 33 to move the pick-off 28 to a voltage null.

The motor element 13 also drives the rate generator element 14, the output of which passes through a conductor 34 to the resistor 35 which forms a part of the summing network, the output of the rate generator being in the correct sense to oppose rotation of the motor element 13. This opposing voltage is proportional to the motor shaft speed. Thus, the amplifier input is constantly kept very near zero by the action of the motor on the shaft of the altitude transducer, which in turn moves the E of the E–1 pick-off in a direction to null the amplifier input.

Since the voltage at the amplifier input is substantially zero, the altitude sensor signal, after the summing resistor, tends to remain equal and opposite to that of the rate generator. The generator and motor are geared to the altitude sensor shaft 33, and thus turn at a rate proportional to altitude rate. The altitude sensor output, before its summing resistor, is off from the null position by an amount proportional to the altitude rate. This signal is of relatively low impedance, and is demodulated to produce a D-C voltage and is fed to a D-C, zero-centered, wide-angle milliammeter, the dial of which is calibrated in terms of altitude rate.

Sudden changes in rate of pressure altitude change are not immediately shown on the milliammeter 17. The time constant which provides a smoothing effect is a function of the summing resistors 30 and 35, the gear ratio employed, the rate generator output and the altitude sensor sensitivity. By varying these parameters, any desired time constant within limits can be achieved. A time constant of about five seconds has been considered desirable for altitude rate indicators by most pilots. A longer constant is too slow for good control, and a shorter time constant results in erratic pointer movement in rough air due to transient errors in the static pressure because of gusts.

To shorten the time constant without the detriment of erratic action, the vertical acceleration of the aircraft is measured by an accelerometer, preferably, although not necessarily, located on a horizontally stable platform at or near the axis of pitch rotation of the aircraft. This is usually near the center of gravity of the aircraft.

Referring to the drawing, the accelerometer, generally indicated by reference character 16, includes a casing 40 mounted on a horizontal plane 41. Disposed within the casing 40 is a torsion pivot 42 which supports a mass 43 upon a horizontal link 44, the mass 43 being counterbalanced by a coil spring 45. Disposed opposite the pivot is an E–1 pick-off, the output of which is transferred to resistor 48 by a conductor 47, the resistor 48 being a part of the summing network.

The accelerometer output signal is summed into the amplifier in the sense that an upward acceleration causes the motor element 13 to drive the altitude sensor shaft to a lower altitude position. This results in a larger signal from the altitude transducer and an increased "up" rate indication. The rotation of the motor element referred to above is opposed by the rate generator. This results in a rate of motor rotation proportional to the accelerational signal, i.e. a motor displacement proportional to acceleration times time or altitude rate. Since the altitude sensor shaft rotation gives a proportional output signal, the rate pointer will indicate the correct rate of change for the acceleration experienced.

The time constant of the rate obtained by integrating the acceleration is made very short, approximately .5 to 1.0 second. This can be used since this rate is not affected by the static pressure error transients in rough air.

The altitude derived rate is made with a time constant of approximately ten seconds. This prevents cumulative error with time as a result of the offset error in the vertical accelerometer. This error, if not corrected by the altitude, would accumulate with time, and the rate pointer would not return to zero rate when the actual rate is zero. This affect will be appreciated by considering the system as such that the integrated acceleration rate is constantly being rezeroed by the pressure altitude signal at a very slow rate.

If the accelerometer is mounted on the airframe, the rate will be in error for a short period while entering or leaving a turn. This effect may be avoided by gyrostabilizing the accelerometer.

I wish it to be understood that I do not consider the invention limited to the precise details of structure shown and set forth in this specification, for obvious modifications will occur to those skilled in the art to which the invention pertains.

I claim:

1. In an altitude rate indicating system, an altitude sensor signal generator element including aneroid means responsive to changes in atmospheric pressure, signal generating means responsive to changes in said aneroid means, motor means connected to said signal generating means to drive the same to null thereby causing the motor means to turn proportionally with altitude, a rate generator means driven by said motor means, a summing network summing the output of said altitude sensor signal generator element and said rate generator, an amplifier receiving the output of said summing network, the output of said amplifier driving said motor means, and an electrical meter directly receiving and displaying the output of said altitude sensor signal generator element.

2. In an altitude rate indicating system, an altitude sensor signal generator element including aneroid means responsive to changes in atmospheric pressure, signal generating means responsive to changes in said aneroid means, motor means connected to said signal generating means to drive the same to null the generator means, thereby causing said motor means to turn proportionately with altitude, a rate generator means driven by said motor means, a summing network summing the output of said altitude sensor element and said rate generator, an amplifier receiving the output of said summing network, the output of said amplifier driving said motor means, an electrical meter directly receiving the output of said altitude sensor element; vertical accelerometer means generating a signal proportional to vertical acceleration, and means connecting the output of said vertical accelerometer means directly to said summing network.

References Cited

UNITED STATES PATENTS

| | | | |
|---|---|---|---|
| 2,934,267 | 4/1960 | Wirkler et al. | 73—386 X |
| 3,068,699 | 12/1962 | Fischer | 73—386 |
| 3,147,622 | 9/1964 | Weir | 73—398 |
| 3,160,013 | 12/1964 | Miller | 73—386 |
| 3,206,975 | 9/1965 | Elwell et al. | 73—179 |

LOUIS R. PRINCE, *Primary Examiner.*

N. B. SIEGEL, *Assistant Examiner.*